Dec. 29, 1953 J. K. MOSSER 2,663,993
DEICING APPARATUS
Filed Oct. 10, 1945 2 Sheets-Sheet 1
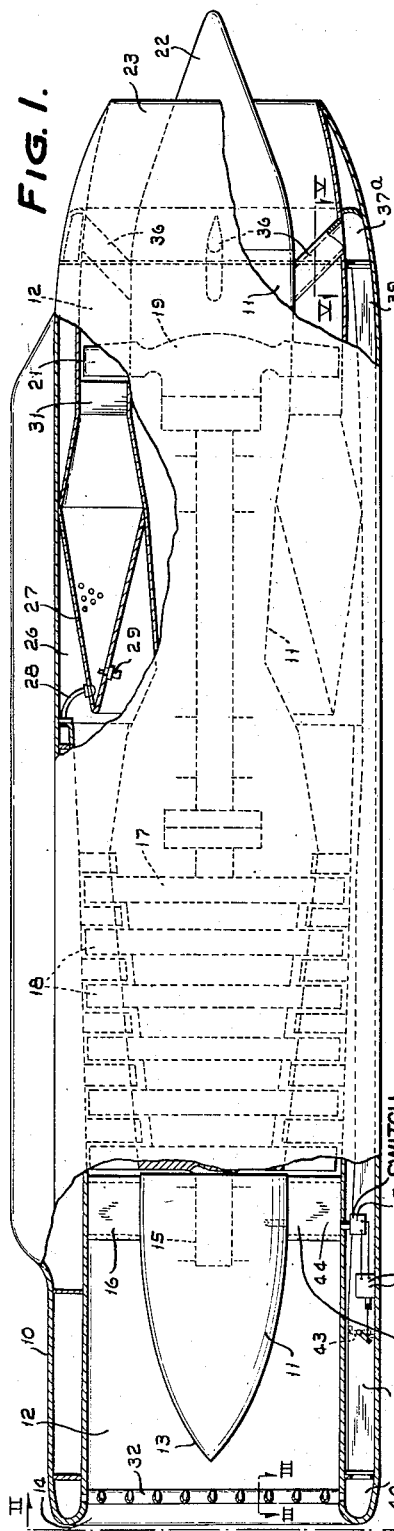
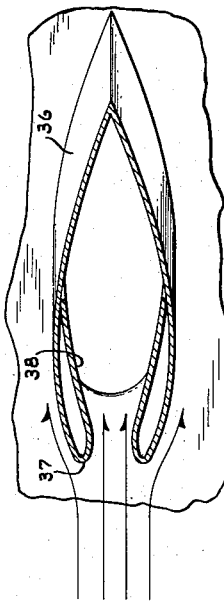
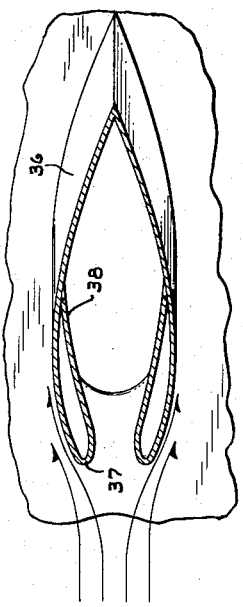
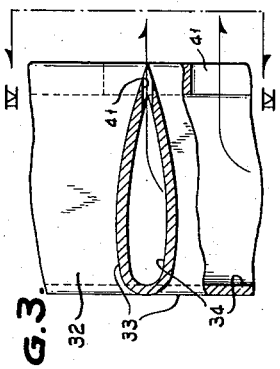
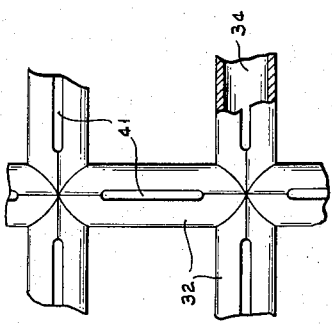
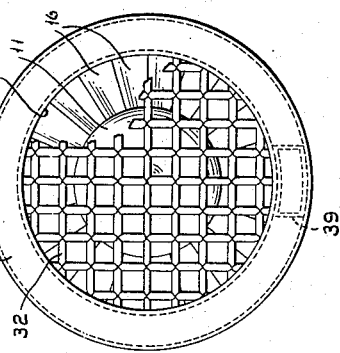
INVENTOR
JAMES K. MOSSER
BY
ATTORNEY Dec. 29, 1953   J. K. MOSSER   2,663,993
DEICING APPARATUS Filed Oct. 10, 1945   2 Sheets-Sheet 2

WITNESSES:

INVENTOR
JAMES K. MOSSER
BY
ATTORNEY

Patented Dec. 29, 1953

2,663,993

UNITED STATES PATENT OFFICE 2,663,993

DEICING APPARATUS

James K. Mosser, Springfield, Pa., assignor to Westinghouse Electric Corporation, East Pittsburgh, Pa., a corporation of Pennsylvania Application October 10, 1945, Serial No. 621,545

7 Claims. (Cl. 60—35.6)

The invention relates to power plants, more particularly to means for de-icing the inlet of the power plant, and it has for an object to provide improved de-icing means of this character.

The invention, while not limited thereto, is particularly adapted to be used to de-ice the inlet of a gas turbine power plant like that disclosed in the patent of Stewart Way, No. 2,405,723, granted August 13, 1946, and assigned to the assignee of the present invention. Such a power plant includes an axial-flow air compressor, a gas turbine driving the compressor, combustion apparatus utilizing compressed air supplied thereto by the compressor to provide heated and compressed gases for operation of the turbine, and a nozzle utilizing gases exhausting from the turbine to provide a propulsion jet, all of these components being housed in line within a tubular casing. A plant of this character is particularly suitable for propelling aircraft at high speeds and it operates generally as follows: Air enters the forward end of the tubular casing for compression by the compressor; the compressed air is then heated in the heating or combustion apparatus by the combustion of fuel supported by the compressed air to provide motive fluid delivered to the turbine, which drives the compressor; and motive fluid issuing from the turbine is discharged through the propulsion nozzle as a jet, the reaction of which serves to propel the aircraft.

In the operation of a power plant of the above-mentioned type under adverse weather conditions, icing may occur at the forward end or compressor inlet. When ice forms at the inlet, the effective cross-sectional area is reduced, thus reducing the quantity of air flowing to the air heating apparatus. This reduction in air flow will diminish the thrust or power output; also, due to the fact that a reduced quantity of combustion and cooling air is flowing through the air heating apparatus, the exhaust gas temperature may rise to a dangerous degree, thereby causing damage to, or destruction of, the power plant.

In accordance with the present invention, there is provided de-icing means which will prevent ice forming at the air compressor inlet, and which is preferably operated only when icing occurs.

It is another object of this invention to provide means for de-icing the inlet to a gas turbine power plant, which means utilizes the exhaust motive fluid of the power plant for this purpose.

It is a further object of this invention to provide means for de-icing the inlet of a gas turbine power plant, which means recirculates a portion of the heated air and does not disturb the air flow conditions when put into or out of operation.

It is a still further object of this invention to provide de-icing means for the inlet of a gas turbine power plant, which is simple in construction and does not add materially to the weight of the power plant.

These and other objects are effected by the invention as will be apparent from the following description and claims taken in connection with the accompanying drawings, forming a part of this application, in which:

Fig. 1 is a side elevational view of a gas turbine power plant in which the present invention has been incorporated, a portion of the outer casing structure being broken away to show details of construction;

Fig. 2 is a front elevational view of the power plant showing the grille with a portion broken away, and taken along the line II—II of Fig. 1, looking in the direction indicated by the arrows;

Fig. 3 is an enlarged detail sectional view of a portion of the grille taken along the line III—III of Fig. 1, looking in the direction indicated by the arows;

Fig. 4 is a partial end elevational view of the grille taken along the lines IV—IV of Fig. 3, looking in the direction indicated by the arrows;

Figs. 5 and 6 are enlarged detail sectional views of one of the struts at the exit end of the power plant taken along the line V—V of Fig. 1, looking in the direction indicated by the arrows, and showing motive fluid flow under different operating conditions;

Figure 7:
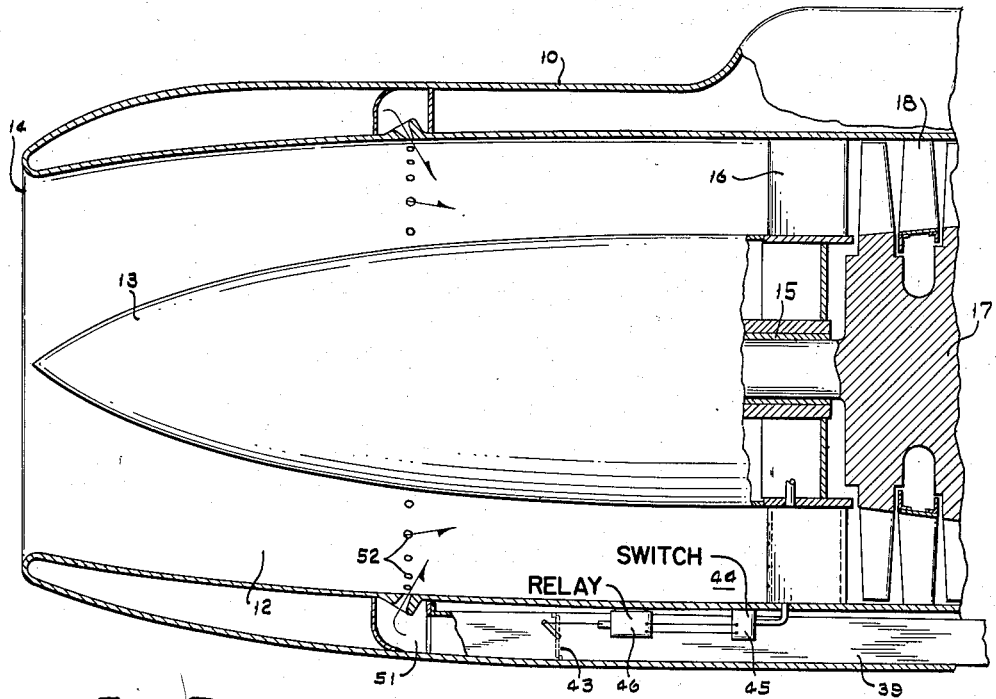
Fig. 7 is a partial side elevational and sectional view of the inlet of the power plant, showing a modified arrangement for applying the invention to the compressor inlet.

Referring now to the drawings, the power plant shown in Fig. 1 comprises in general an outer tubular casing structure 10, open from end to end and having a central core 11 providing, with the casing, an annular flow passage 12, which, if the plant is to be used for propelling an airplane, is adapted to extend fore and aft with respect to the latter.

The central core structure 11 is supported by the outer casing structure 10 along its longitudinal axis and includes a hollow fairing cone 13 defining, with the forward or left end of the casing 10, an air inlet 14. The fairing cone 13 may be utilized to house a starter, gearing for driving auxiliary apparatus (not shown), and a front bearing 15.

The core 11 also includes a rotor 17 of an axial-flow compressor 18, a rotor 19 of a gas turbine 21 and a longitudinally-adjustable conical tailpiece 22 which defines, with the rear end of the casing 10, an adjustable propulsion nozzle 23.

The intermediate portion of the core structure 11 between the compressor 18 and the turbine 21, cooperates, with the outer casing 10, to define an annular chamber 26 connecting the compressor blade passage and the turbine blade passage and within which there is disposed suitable combustion apparatus to add heat to the compressed air to provide heated and compressed elastic fluid for the turbine.

In operation, air entering at the inlet 14 is compressed by the compressor 18 and flows into the annular chamber 26. The compressed air then passes through the openings in the walls of the burner tube 27 and mixes with the atomized fuel supplied by the nozzles 28. The air and fuel mixture is ignited by the spark plugs 29 and burns steadily thereafter. The motive fluid comprising the products of combustion and the excess air flows from the burner tube 27 and is directed by guide vanes or nozzles 31 into the blade passage of the turbine rotor 19. The turbine extracts at least sufficient energy from the motive fluid to drive the compressor 18 and other auxiliary apparatus.

The spent gases leaving the turbine are discharged through the propulsion nozzle 23 at a high velocity so that the remaining available energy in the motive fluid is effective to propel the aircraft. The tailpiece 22 is preferably axially movable with respect to the casing 10 so that the back pressure on the turbine and the jet effect produced by the propulsion nozzle may be varied.

Figure 8:
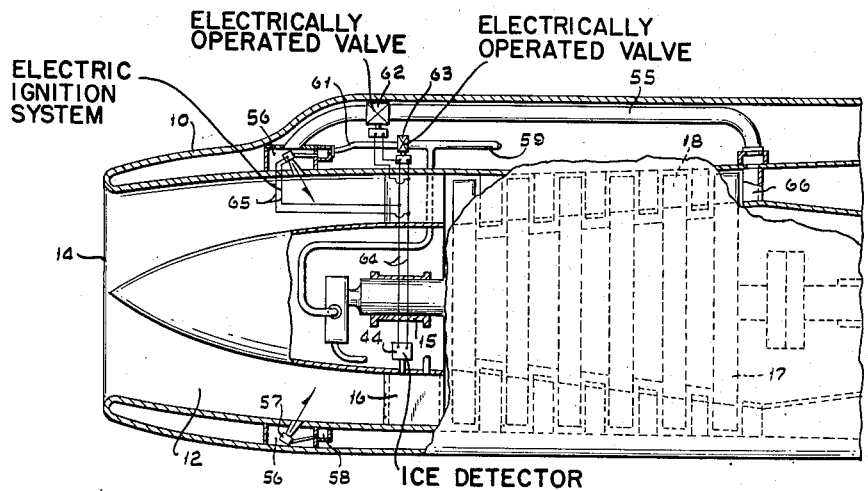
Fig. 8 is a diagrammatic partial side elevational and sectional view of the inlet of the power plant showing another modification.

The present invention is concerned with means for preventing icing at the air inlet in power plants of the above-mentioned and other types, and more particularly, with the prevention of ice formation at the most vulnerable point of the inlet, that is, on grille 32 (Figs. 1 and 2) and on inlet guide vanes 16 (Figs. 7 and 8).

Referring to the embodiment shown in Figs. 1 to 6, the grille 32 is primarily utilized to prevent foreign objects from being drawn into the compressor 18. Although the grille 32 has the disadvantage of additional weight, tendency to decrease the ram effect, and icing under adverse weather conditions, which throttles the air flowing therethrough with the resultant danger, as mentioned heretofore, it is advantageous, nevertheless, under certain conditions, to incorporate it in the inlet.

To minimize the weight of the grille 32 without materially sacrificing strength, it is preferably formed of a plurality of horizontally and vertically spaced streamlined tubes or foils 33, formed, assembled and brazed or welded together in any suitable manner to form a unitary rigid structure. To overcome the disadvantage of icing, the foils 33 provide passage means 34 for the circulation of heated gases therein, to remove ice accumulating thereon in a manner to be hereinafter described.

The rear portion of the central core structure 11, in which the adjustable tailpiece is mounted, is supported by the casing 10 with a plurality of hollow streamlined struts 36. These struts 36 are disposed in the annular flow path 12, intermediate the turbine 21 and the exit portion of the propulsion nozzle 23.

Accordingly, one or more of the hollow struts 36 are formed with their leading edges 37 open to provide a passage 38 for the flow of heated gases into the interior thereof. This construction provides means for collecting therein, when necessary, a portion of the heated motive fluid exhausting from the turbine 21, for delivery to an annular chamber 37a disposed at the rear portion of the casing. Also, due to the high velocity of the gases flowing along the annular flow path 12 to the propulsion nozzle, the passage 38 is preferably made divergent to effect a velocity to pressure conversion. Thus, as shown in Fig. 5, when heated gases are being bled off for de-icing, the gases approaching the struts 36 flow into its open end without disturbing the remainder of the propulsion gases and is converted to a higher pressure therein, and, as shown in Fig. 6, during intervals when de-icing is not required, a pressure is built up at the forward end of the strut 36 to cause the approaching gases to flow around its leading edge 37 in a normal manner.

The heated gases entering the chamber 37a from the interior of the struts 36 are conducted forwardly by a conduit 39 to an annular distributing header 40, disposed around the grille 32, and the grille is fastened to the header 40 so as to provide means for connecting the hollow passages 34 therein to the interior of the header. Preferably, as shown in Figs. 3 and 4, the trailing edges of the foils 33 are provided with a plurality of relatively small slots or openings 41. These slots 41 allow the escape of heated gases into the air inlet after they pass through the grille to heat the same. It is to be understood that other means for disposing of the heated gases, after passing through the grille, may be provided. However, with the slots 41 directed downstream, as shown, a suction effect is created at this point, which will cooperate with the pressure developed in the struts 36 to permit a larger quantity of heated gases to flow through the grille and remove the ice accumulating thereon. Also, the heat remaining in the gases discharged through the slots 41 will remove the ice that may have collected on the guide vanes 16, which, as shown in Fig. 1, is the next most vulnerable point where icing occurs. It is to be further noted that the heated gases or products of combustion recirculated to the inlet, will not affect the operation of the power plant because a plant of this character is normally supplied with large quantities of excess air for cooling the products of combustion to a temperature suitable for utilization in the turbine and the propulsion jet.

Under normal power plant operation, it is not desirable to permit the flow of heated gases to the grille 32, because, to obtain the highest possible compressor efficiency and consequently the highest thrust output, air entering the inlet 14 should be as cold as possible, and if heated air were supplied continuously to the compressor inlet 14, the overall efficiency of the power plant would be reduced. However, during periods when icing does occur, removal of the ice from the grille 32 is more important than avoiding the overall drop in efficiency caused by the heated air entering the compressor 18.

Accordingly, a valve 43 is disposed in the conduit 39, intermediate the chamber 37 and the header 40, to control the flow of heated de-icing gases delivered to the grille 32. This valve 43 is preferably under the control of an ice-detecting mechanism, generally indicated at 44. One form of ice detector mechanism which may be used is fully described and claimed in the copending application of Charles D. Flagle, Serial No. 618,140, filed September 24, 1945, now Patent No. 2,469,375, granted May 10, 1949, and assigned to the assignee of the present invention.

Briefly, the ice detector mechanism, as disclosed in the above-mentioned Flagle application, operates as follows: A small portion of the air flowing into the inlet 14 passes through an inlet orifice or orifices, located in one of the inlet guide vanes 16, or any other suitable point where icing is most likely to occur, to the interior of the guide vane. The interior of this guide vane is connected to a vacuum pump through an outlet orifice having a slightly smaller diameter than the inlet orifice, and a pressure-responsive switch 45 is placed in direct communication with the interior of the guide vane.

When ice accumulates on the above-mentioned guide vane, the inlet orifice area is restricted by the accumulation of ice and when the area of the inlet orifice is less than that of the outlet orifice the vacuum pump will lower the pressure in the guide vane. The switch 45 will, at a predetermined low pressure in the interior of the guide vane, operate to actuate a relay 46 to open the valve 43, thus permitting the flow of heated gases from the strut 36 to the grille 32 to supply heat thereto and remove the ice accumulation thereon. The switch 45 is responsive to return to a predetermined high pressure in the hollow guide vane, due to the removal of ice from the inlet orifice, to allow the valve 43 to close, thereby interrupting the flow of heated gases to the grille 32.

Thus, it can be seen that the flow of heated gases to the grille will be under control of the ice detector mechanism 44, and that the valve 43 will be opened only during the interval when ice accumulation occurs.

Referring now to the embodiment shown in Fig. 7, the grille 32 is eliminated. However, as previously mentioned, icing may occur on the inlet guide vanes 16. In this modification, an annular distributing chamber 51, for receiving heating gases from the conduit 39, is placed around the annular flow path 12, intermediate the air inlet 14 and the inlet guide vanes. A plurality of openings or nozzles 52 are disposed so as to be in communication with the interior of the chamber 51 and the annular flow path 12. The valve 43 and the ice-detecting mechanism 44 operate in a similar manner and under the same conditions as previously mentioned. However, in this case the heated gases, when required, are discharged directly into the air stream to heat the air and remove the ice accumulation on the guide vanes.

In the embodiment shown in Fig. 8, there is disclosed slightly different means for heating the incoming air during periods when icing occurs. In this modification, a portion of the compressed air discharged by the compressor 18 is conducted forwardly through a conduit 55 to a distributing chamber 56 disposed around the annular flow path 12 intermediate the inlet 14 and guide vanes 16. A plurality of fuel burners 57 are arranged in the chamber 56 so as to receive combustion air therefrom. These burners 57 are connected to a fuel manifold 58 that receives fuel from a supply pipe 61. This supply pipe 61 is preferably connected to the main fuel system 59, which supplies the burner tube 27. A normally closed electrically-operated valve 62, for controlling air flow, is disposed in the compressed air conduit 55, and a normally closed electrically-operated valve 63, for controlling the flow of fuel, is disposed in the branch pipe 61. These two valves are preferably under the direct control of the ice-detecting mechanism 44, through an electrical circuit 64. The ice detector 44 operates in a manner similar to that previously mentioned.

When icing occurs on the inlet guide vanes 16, the ice detector 44 operates, in response to a predetermined low pressure, to cause energization of the electrical circuit 64 to actuate the valves 62 and 63 to open position and thus permit the flow of compressed air and fuel to the burners 57. At the same time, an electrical circuit 65, in parallel with the circuit 64, is energized to energize conventional ignition means for igniting the air-fuel mixture in the burners 57. This circuit 65 might comprise a suitable source of electrical energy whose flow to conventional spark plugs is controlled by the wires shown as connected into the circuit 64 which operates in response to action of the ice detector 44. Energization of this circuit 65 causes sparking of the spark plugs to ignite the fuel-air mixture passing the opened valves 62 and 63. The heated air is discharged from the burners into the forward portion of the annular flow path 12 to heat the air entering the inlet and thus cause the removal of the ice accumulation on the inlet guide vanes 16. After ice removal, the ice detector mechanism will operate, in response to a high pressure therein, to deenergize the electrical circuit and to permit closing of the valves 62 and 63 to terminate the operation of the air heating mechanism.

The conduit 55 is preferably connected to a series of struts or straightening vanes 66 at the discharge of the compressor 18 in a manner similar to that described in the first embodiment. Also, it is to be noted that the air entering the conduit 55 from the discharge side of the compressor may have considerable heat and, under certain conditions, the burning of fuel may not be necessary.

While the invention has been shown in several forms, it will be obvious to those skilled in the art that it is not so limited, but is susceptible of various other changes and modifications without departing from the spirit thereof.

What is claimed is:

1. In a gas turbine power plant, structure defining a flow passage having its inlet open to the atmosphere and including a compressor, a turbine driving the compressor, and combustion apparatus; said turbine and compressor each including blading in the flow passage and said combustion apparatus being arranged in the latter between the compressor blading and the turbine blading; a hollow grille disposed in the passage ahead of the compressor blading and subject to icing, a hollow supporting member extending across said flow passage and having openings therein communicating with said passage for withdrawal of heated elastic fluid therethrough, a conduit connecting the grille and the supporting member, a valve disposed in said conduit, and ice-detecting means responsive to ice formation in the inlet for actuating said valve to permit flow of heated elastic fluid through the interior of the grille to remove ice from the inlet.

2. In a gas turbine power plant, structure defining a flow passage having its inlet end open to the atmosphere and formed to provide a propulsion nozzle at its discharge end and including a compressor, a turbine driving the compressor, and combustion apparatus; said compressor and turbine each having blading in the flow passage and the combustion apparatus being arranged in the latter between the compressor blading and the turbine blading; said structure also including hollow supporting members extending across the flow passage between the turbine blading and the discharge end of the nozzle, said members having openings therein communicating with said passage for withdrawal of heated elastic fluid therethrough, a hollow grille in the passage ahead of the compressor blading, a conduit connecting the grille to the supporting member, a normally closed valve disposed in said conduit, and ice detector means operative in response to ice formation in the inlet to actuate said valve to permit flow of heated elastic fluid through the interior of said hollow grille to heat the latter and the entering air flowing therepast to effect removal of ice from the inlet.

3. In a gas turbine power plant, structure defining a flow passage having its inlet end open to the atmosphere and formed to provide a propulsion nozzle at its discharge end and including a compressor, a turbine driving the compressor, and combustion apparatus; said compressor and turbine each having blading in the flow passage and the combustion apparatus being arranged in the latter between the compressor blading and the turbine blading; said structure also including hollow supporting members extending across the flow passage between the turbine blading and the discharge end of the nozzle, said members having openings therein communicating with said passage for withdrawal of heated elastic fluid therethrough, a hollow grille in the passage ahead of the compressor blading and subject to icing, and said hollow grille being provided with a plurality of openings therein communicating with the inlet, a conduit connecting the grille to the supporting member, a normally closed valve disposed in said conduit, and ice detector means operative in response to ice formation in the inlet to actuate said valve to permit flow of heated elastic fluid through the interior of said hollow grille and out of the openings into the inlet to remove the ice therefrom, said means being operative in response to the removal of the ice formation, to interrupt the flow of heated elastic fluid to said grille.

4. In a gas turbine power plant, structure defining a flow passage having its inlet end open to the atmosphere and formed to provide a propulsion nozzle at its discharge end and including a compressor, a turbine driving the compressor, and combustion apparatus; said compressor and turbine each having blading in the flow passage and the combustion apparatus being arranged in the latter between the compressor blading and the turbine blading; said structure also including hollow supporting members extending across the flow passage between the turbine blading and the discharge end of the nozzle, said members having openings therein communicating with said passage for withdrawal of heated elastic fluid therethrough, a distributor in the passage ahead of the compressor blading, a conduit connecting the distributor to the supporting member, a normally closed valve in said conduit, and ice detector means operative in response to ice formation in said inlet to open said valve to permit flow of heated elastic fluid through the distributor into the inlet for the removal of ice therefrom.

5. In an aircraft power plant comprising a gas turbine engine having a compressor, combustion equipment in which air from the compressor is heated, and a turbine driven by the heated air, a casing enclosing the power plant, and an air intake duct leading from the forward end of said casing to the intake of the compressor; means for substantially uniformly heating the air entering the air intake duct comprising header means in the casing at the air intake duct, a grid-like structure of hollow tubes having inlets thereto in the header means and outlets therefrom distributed over the grid.

6. In an aircraft power plant comprising a gas turbine engine having a compressor, combustion equipment in which air from the compressor is heated, and a turbine driven by the heated air, a casing enclosing the power plant, and an air intake duct leading from the forward end of said casing to the intake of the compressor; means for substantially uniformly heating the air entering the air intake duct comprising header means encircling the air intake duct at the intake end thereof, a grid-like structure of hollow tubes having inlets thereto in the header means and outlets therefrom distributed over the grid, and a controllable means to supply hot gases to the header means.

7. In an aircraft power plant comprising a gas turbine engine having a compressor, combustion equipment in which air from the compressor is heated, and a turbine driven by the heated air, a casing enclosing the gas turbine engine, and an air intake duct leading from the forward end of said casing to the intake of the compressor; means for substantially uniformly heating the air entering the air intake duct comprising a grid-like structure of hollow tubes disposed generally transversely of said duct adjacent the inlet end thereof, and header means in communication with said hollow tubes for admission of heated fluid to the latter, said tubes having outlets therefrom distributed over the grid for discharge of heated fluid into the air entering the intake duct.

JAMES K. MOSSER.

References Cited in the file of this patent

UNITED STATES PATENTS

| Number | Name | Date |
|---|---|---|
| 2,356,370 | Allen | Aug. 22, 1944 |
| 2,404,275 | Clark et al. | July 16, 1946 |
| 2,405,723 | Way | Aug. 13, 1946 |
| 2,469,375 | Flagle | May 10, 1949 |

FOREIGN PATENTS

| Number | Country | Date |
|---|---|---|
| 567,702 | France | Dec. 11, 1923 |
| 871,408 | France | Jan. 15, 1942 |